US012222154B2

(12) United States Patent
Evans et al.

(10) Patent No.: US 12,222,154 B2
(45) Date of Patent: Feb. 11, 2025

(54) MULLION STRUCTURE FOR AN APPLIANCE

(71) Applicant: ELECTROLUX CONSUMER PRODUCTS, INC., Charlotte, NC (US)

(72) Inventors: Gregory H. Evans, Concord, NC (US); Terry Sexton, Anderson, SC (US)

(73) Assignee: ELECTROLUX CONSUMER PRODUCTS, INC., Charlotte, NC (US)

( * ) Notice: Subject to any disclaimer, the term of this patent is extended or adjusted under 35 U.S.C. 154(b) by 696 days.

(21) Appl. No.: 17/203,961

(22) Filed: Mar. 17, 2021

(65) Prior Publication Data

US 2021/0293468 A1 Sep. 23, 2021

Related U.S. Application Data

(60) Provisional application No. 62/993,507, filed on Mar. 23, 2020.

(51) Int. Cl.

| | |
|---|---|
| ***E05C 3/14*** | (2006.01) |
| ***E05C 7/00*** | (2006.01) |
| ***F25D 23/02*** | (2006.01) |

(52) U.S. Cl.
CPC .............. *F25D 23/028* (2013.01); *E05C 3/14* (2013.01); *E05C 7/005* (2013.01)

(58) Field of Classification Search
CPC ... E05C 7/00; E05C 7/005; E05C 7/02; E05C 7/002; E05C 7/04; E05C 7/06; E05C 3/00; E05C 3/006; E05C 3/008; E05C 3/12; E05C 3/14; E05C 3/16; E05C 3/162; E05C 3/22; E05C 3/24; E05C 3/30; E05C 3/36; E05B 65/0042; E05B 65/0046; Y10S 292/30; Y10S 292/63; Y10S 292/71; F25D 23/028
See application file for complete search history.

(56) References Cited

U.S. PATENT DOCUMENTS

| | | | | |
|---|---|---|---|---|
| 2015/0308158 | A1* | 10/2015 | Jeon | E05B 65/0042 312/405 |
| 2016/0138855 | A1* | 5/2016 | Choo | E05B 7/00 312/405.1 |
| 2017/0051542 | A1* | 2/2017 | Reske | E05B 63/244 |
| 2018/0142945 | A1* | 5/2018 | Bodine | F25D 23/02 |
| 2019/0032990 | A1* | 1/2019 | Wantland | E05C 7/02 |

* cited by examiner

*Primary Examiner* — Christine M Mills
*Assistant Examiner* — Christopher F Callahan
(74) *Attorney, Agent, or Firm* — Moore & Van Allen PLLC; R.W. Mccord Rayburn

(57) ABSTRACT

A refrigerated cabinet may include: a plurality of side walls forming a cabinet body and an interior storage space, the interior storage space accessible through an opening; a first door and a second door independently positionable over the opening; and a mullion formed by the second door, wherein the first door is configured to engage with the mullion. The mullion is a fixed structure formed by a portion of the second door. The refrigerated cabinet may further include a latching mechanism configured to selectively couple the first door and the second door, wherein the latching mechanism extends through the first door to engage the second door. The latching mechanism comprises a user-actuatable interface configured to decouple the first door and the second when the user-actuatable interface is engaged by a user.

20 Claims, 3 Drawing Sheets

MULLION STRUCTURE FOR AN APPLIANCE

CROSS-REFERENCE TO RELATED APPLICATION

The present application claims the benefit of U.S. Patent Application No. 62/993,507 for a "Mullion Structure for an Appliance," filed Mar. 23, 2020, which is hereby incorporated by reference in its entirety.

FIELD OF THE INVENTION

The present invention relates to doors for storage appliances and, more specifically, to an interlocking door system having partially overlapping doors with a fixed mullion for use with, for example, a refrigerated cabinet.

BACKGROUND

Refrigerated storage cabinets (e.g., "refrigerators") having more than one door typically include a mullion structure. Generally, within the field of refrigerator design, a mullion is a horizontal or vertical member formed by the body of a refrigerator for providing a division between or within compartments of a storage space covered by individual doors of the refrigerator and for providing a surface on which the doors may close and/or seal against. Fixed mullion structures are typically formed inside the storage space wherein the doors engage with the fixed mullion when closed. Alternatively, non-static mullion designs such as flipper mullions are formed on and between portions of the doors themselves to remove the need for a mullion within the storage space while still providing a sealing and engagement surface between the doors (e.g., side-by-side or French doors). While flipper mullions provide an alternative to a traditional, internal mullion structure, these non-static mullion designs require moving parts and surfaces that increase a potential for failure and introduce gaps that may decrease sealing efficiency when compared to an integrally formed structure.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In one aspect, a refrigerated cabinet is presented that may include a plurality of side walls forming a cabinet body and an interior storage space, where the interior storage space may be accessible through an opening. The refrigerated cabinet may include a first door and a second door independently positionable over the opening and a mullion formed by the second door, where the first door is configured to engage with the mullion. The refrigerated cabinet may include a latching mechanism configured to selectively couple the first door and the second door.

In some embodiments, the mullion may be a fixed structure formed by a portion of the second door.

In some embodiments, the latching mechanism may include a pivoting arm and/or a bell crank extending through the first door to engage the second door.

In some embodiments, the latching mechanism may extend through the first door to engage the second door.

In some embodiments, the latching mechanism further may include a user-actuatable interface configured to decouple the first door and the second door when the user-actuatable interface is engaged by a user.

In some embodiments, the refrigerated cabinet may include a gasket positioned on the mullion formed by the second door and/or on the first door. Additionally, or alternatively, the gasket may be configured to form a seal at an interface between the mullion and the first door when the first door is coupled to the second door.

In some embodiments, the first door may be an upper door, and the second door may be a lower door.

In some embodiments, the first door may be a lower door, and the second door may be an upper door.

In some embodiments, the first door and the second door may be side-by-side doors.

In some embodiments, the interior storage space may include a fresh food compartment, where each of the first door and the second door are positionable over the fresh food compartment.

In another aspect, a refrigerated cabinet is presented that may include a cabinet body having an interior storage space, where the interior storage space may be accessible through an opening. The refrigerated cabinet may include a first door positionable over the opening, where the first door may include a first portion recessed toward an exterior side of the first door, and where the exterior side is oriented away from the interior storage space. The refrigerated cabinet may include a second door positionable over the opening independently from the first door, where the second door may include a second portion recessed toward an interior side of the second door, where the interior side is oriented toward the interior storage space. In some embodiments, the second portion may form a fixed mullion with which the first portion of the first door engages. The refrigerated cabinet may include a latching mechanism configured to selectively couple the first door and the second door.

In some embodiments, the second portion of the second door may provide a divider between two or more divisions of the interior storage space.

In some embodiments, the second portion of the second door may include an exterior-facing sealing surface configured to engage a corresponding surface of the first portion of the first door.

In some embodiments, the refrigerated cabinet may include a gasket positioned on the first portion of the first door or positioned on the second portion of the second door, where the gasket is configured to generate a seal between the first portion and the second portion.

In some embodiments, the latching mechanism may include a user-actuatable interface configured to decouple the first door and the second door when the user-actuatable interface is engaged by a user.

In yet another aspect, a refrigerated cabinet is presented that may include a cabinet body having an interior storage space, where the interior storage space may be accessible through an opening. The refrigerated cabinet may include a first door and a second door independently positionable over the opening, where, when positioned approximately parallel to each other, the first door and the second door partially overlap with each another and interlock. The refrigerated cabinet may include a mullion formed by the second door, where the first door is configured to engage with the mullion. The refrigerated cabinet may include a latching mechanism configured to selectively couple the first door and the second door.

In some embodiments, the mullion may provide a divider between two or more divisions of the interior storage space.

In some embodiments, the mullion may include an exterior-facing sealing surface configured to engage a corresponding surface of the first door.

In some embodiments, the latching mechanism may extend through the first door to engage the second door.

In some embodiments, the interior storage space may include a fresh food compartment, where each of the first door and the second door are positionable over the fresh food compartment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
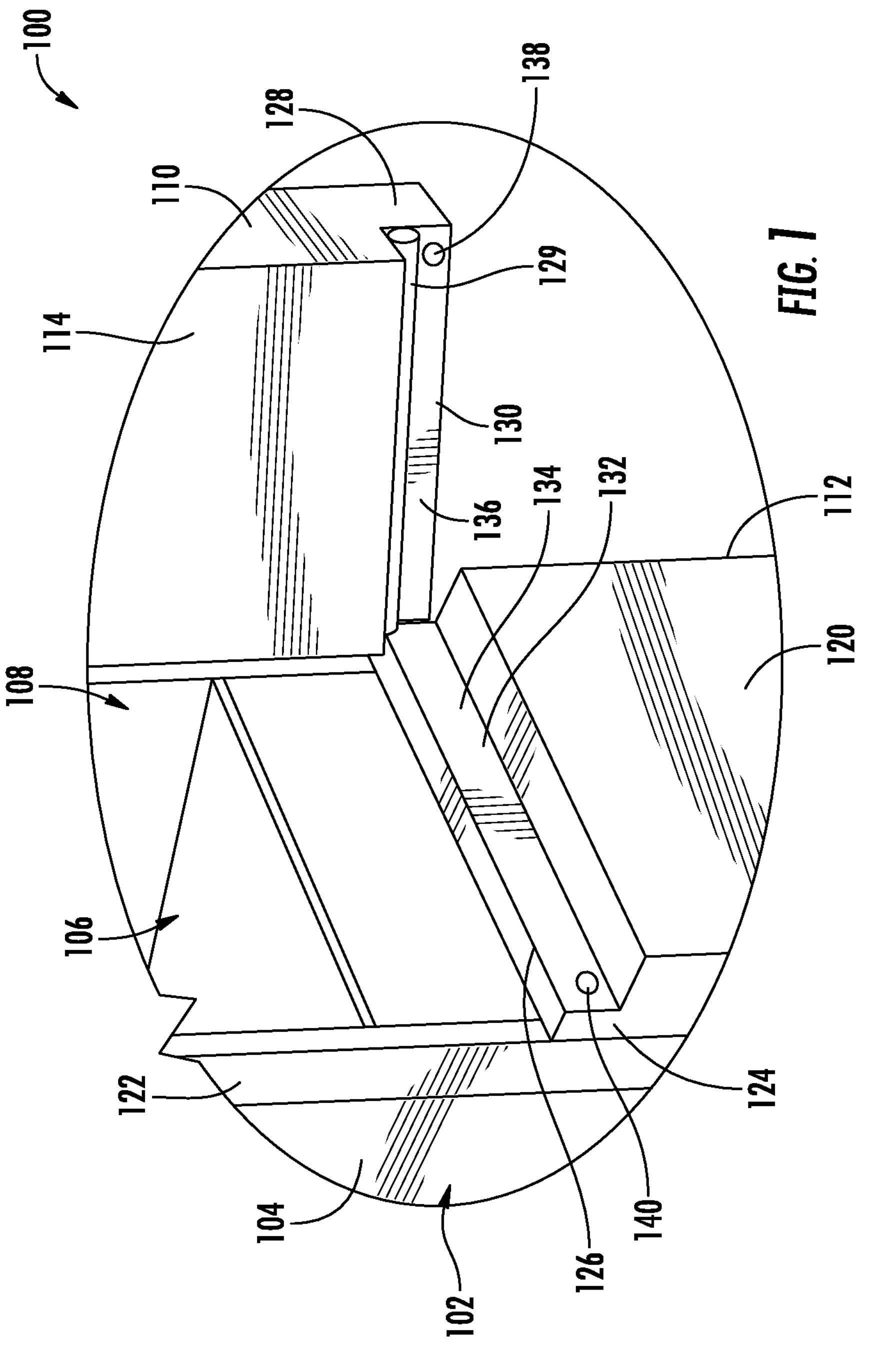
Figure 2:
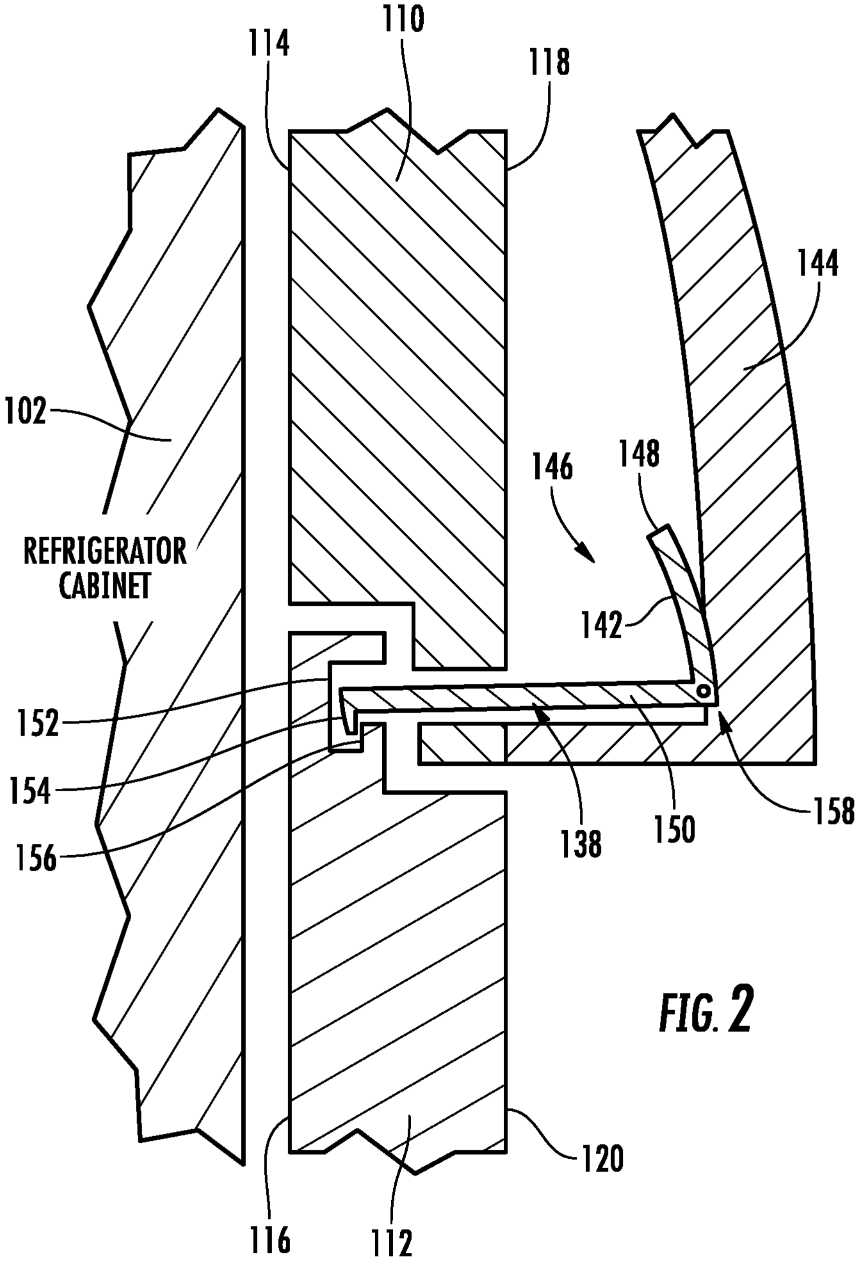
Figure 3:
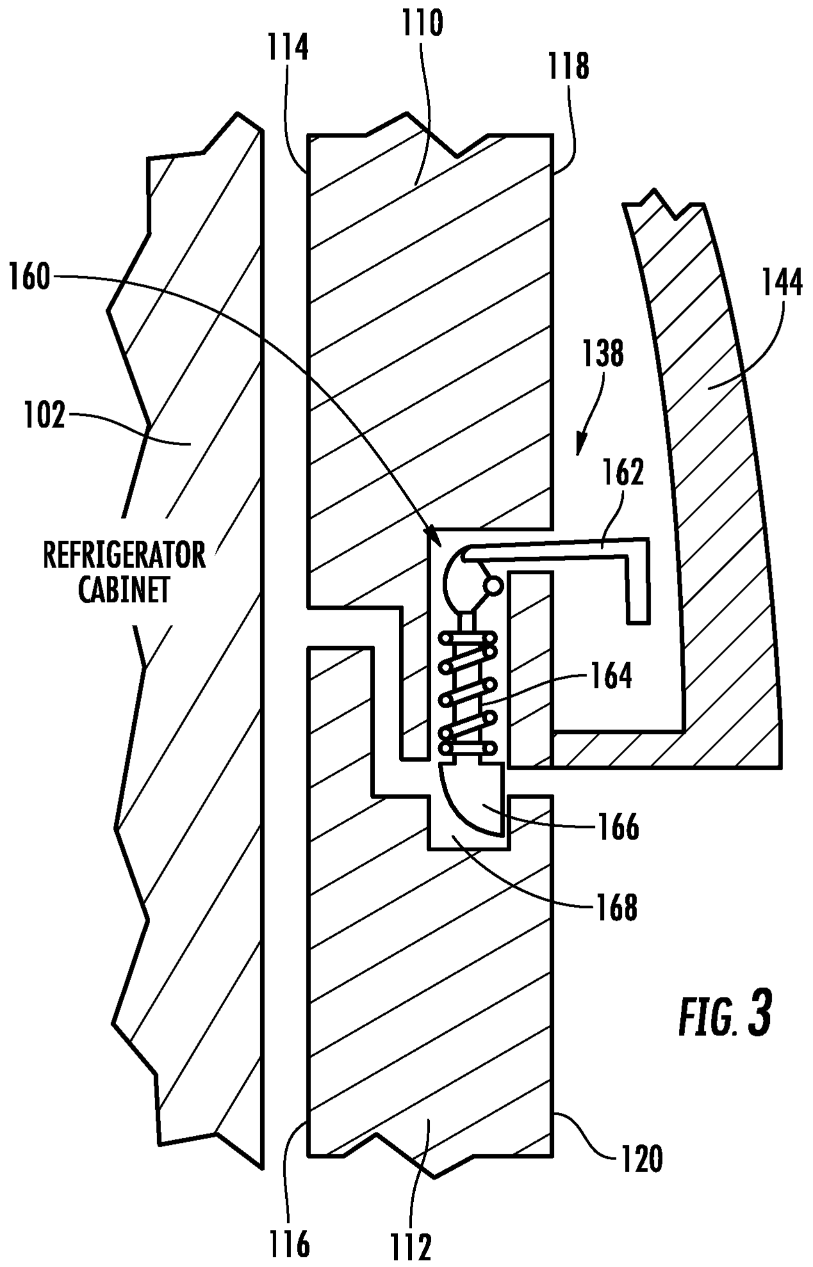

Having thus described embodiments of the invention in general terms, reference will now be made to the accompanying drawings, wherein:

FIG. 1 illustrates a perspective view of a mullion configuration for a refrigerated cabinet, in accordance with one embodiment of the present invention;

FIG. 2 illustrates a cross-sectional view of a latching mechanism configuration, in accordance with one embodiment of the present invention; and FIG. 3 illustrates a cross-sectional view of a latching mechanism configuration, in accordance with one embodiment of the present invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As noted, refrigerated storage cabinets (e.g., "refrigerators") having more than one door typically include a mullion structure. Generally, within the field of refrigerator design, a mullion is a horizontal or vertical member formed by the body of a refrigerator for providing a division between or within compartments of a storage space covered by individual doors of the refrigerator and for providing a surface on which the doors may close and/or seal against. Fixed mullion structures are typically formed inside the storage space wherein the doors engage with the fixed mullion when closed. Alternatively, non-static mullion designs such as flipper mullions are formed on and between portions of the doors themselves to remove the need for a mullion within the storage space while still providing a sealing and engagement surface between the doors (e.g., side-by-side or French doors). While flipper mullions provide an alternative to a traditional, internal mullion structure, these non-static mullion designs require moving parts and surfaces that increase a potential for failure and introduce gaps that may decrease sealing efficiency when compared to an integrally formed structure. As such, there exists a need for an improved mullion structure and door latching system that provides improved durability and seal efficiency over existing designs. Embodiments of the present invention are directed to a fixed mullion structure formed between doors of a refrigerated cabinet to allow for selective repositioning (i.e., opening and closing) of the doors independent of one another. Furthermore, unique latching mechanisms between said doors are provided to enhance user accessibility.

It should be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled).

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

FIGS. 1-3 provides an illustration of a storage cabinet and, in particular, a refrigerated storage cabinet or refrigerator. It should be understood that a "refrigerator," as used herein, may be used to refer to any refrigerated device or appliance configured to maintain a temperature-regulated environment within an interior storage space or compartment. For example, a "refrigerator," as used herein, may further include a freezer. As illustrated in the figures, the refrigerated cabinet 100 comprises a cabinet body 102 having a plurality of sidewalls 104 defining an interior storage space 106 (e.g., an interior cavity). The interior storage space 106 may include, for example, a fresh food compartment and/or a freezer compartment. The refrigerated cabinet 100 further includes at least one opening 108 (e.g., an aperture) providing access to the interior storage space 106. The refrigerated cabinet 100 has one or more doors 110, 112 operatively coupled (e.g. hingedly coupled) to the cabinet body 102 of the refrigerated cabinet 100 and positionable over the at least one opening 108 for closing or providing access to the interior storage space 106.

In the non-limiting embodiment illustrated in FIGS. 1-3, the refrigerated cabinet 100 includes an upper door 110 and a lower door 112 (e.g., Dutch doors). Each of the upper door 110 and the lower door 112 have an interior side 114, 116 (e.g., an interior surface) and an exterior side 118, 120 (e.g., an exterior surface), respectively. The interior sides 114, 116 of the doors are configured to face the interior storage space 106 of the refrigerated cabinet 100 when the doors are closed. The exterior sides 118, 120 of the doors are positioned opposite the corresponding interior sides 114, 116 and form a portion of the exterior surface of the cabinet body 102 when the doors 110, 112 are closed. The doors 110, 112 further include at least one handle 144 for allowing a user to manipulate or reposition (e.g., open or close) the doors 110, 112. In the illustrated embodiment, the handle 144 is positioned on an exterior side 118 of the upper door 110.

When the doors 110, 112 are closed over the opening 108, the interior sides 114, 116 of the doors 110, 112 are configured to engage a front facing edge 122 formed by the sidewalls 104 of the cabinet body 102. By engaging the front facing edge 122 of the sidewalls and being positioned over the opening 108 of the refrigerated cabinet 100, the doors 110, 112 effectively close-off or seal the interior storage space 106 from an external environment. In some embodiments, a gasket or other sealing component is positioned on the interior sides 114, 116 (e.g., around a periphery edge) and/or on the edge 122 to create a substantially air-tight seal between the doors 110, 112 and the edge 122 of the cabinet body 102. In an exemplary embodiment, the gasket is a shaped piece of rubber or other material configured for creating a sealed junction between two surfaces (e.g., between the interior sides 114, 116 and the edge 122). By generating a non-permanent seal between the surfaces, the interior storage space 106 may be more efficiently maintained at a desired temperature, humidity, and/or the like different than that of an external environment.

As illustrated in embodiments of FIGS. 1-3, the upper door 110 and the lower door 112 typically are structured so as to partially overlap with one another and interlock when the doors 110, 112 are positioned approximately parallel to one another (e.g., in a closed state or when opened together). In the illustrated embodiment, an upper portion 124 of the exterior side 120 of the lower door 112 is recessed toward the interior side 116 of the lower door to form a recessed portion 126. Similarly, a lower portion 128 of the interior side 114 of the upper door 110 is recessed toward the exterior side 118 of the upper door 110 to form a corresponding recessed portion 130 on the upper door 110. The recessed portion 130 of the upper door 110 is shaped to align on top of and engage with the recessed portion 126 of the lower door 112 when the doors 110, 112 are positioned together. For example, when the upper door 110 and the lower door 112 are both in a closed position, the interior sides 114, 116 and the exterior sides 118, 120 are approximately parallel with one another and the recessed portions 126, 130 of each door are aligned or interlocked.

The recessed portion 126 of the lower door 112 is configured to act as a mullion 132 for the refrigerated cabinet 100 on which one or more other doors (e.g., upper door 110) may engage. The mullion 132 formed at the upper portion 124 of the lower door 112 provides a divider between two or more divisions of the interior storage space 106 of the cabinet body 102. The mullion 132 includes an exterior-facing sealing surface 134 that is configured to engage with a corresponding surface 136 of the recessed portion 130 of the upper door 110 to couple the doors 110, 112 together. The surface 136 of the upper door 110 may include a gasket 129 or similar sealing mechanism for generating a seal between the engaged surfaces, particularly at the interface between the mullion 132 and surface 136 of the upper door 110. Alternatively, the gasket 129 may be positioned on the exterior-facing sealing surface 134 of the mullion 132. In this way, when the upper door 110 is positioned in a closed position, the upper door 110 forms a seal with both the edge 122 of the cabinet body 102 and the mullion 132 formed by the lower door 112.

By incorporating a fixed mullion 132 into the structure of the lower door 112, the present design eliminates the need for a traditional mullion structure within the interior storage space 106 of the refrigerated cabinet thereby increasing an amount of space for potential storage within the cabinet body 102. Furthermore, a fixed mullion eliminates additional moving components required by other non-fixed mullion designs (e.g., flipper mullions) thereby reducing a number of potential points of mechanical failure and gaps in a formed seal.

Because the lower door 112 provides a mullion 132 for engaging with the upper door 110, the doors 110, 112 may be operated (i.e., opened or closed) in unison. Alternatively, the upper door 110 may be operated independently of the lower door. For example, the upper door 110 may be opened independent of the lower door 112 which may remain in a closed position. In some embodiments, the doors 110, 112 are used to provide access to individual divisions of the interior storage space 106. By providing independent operation of the upper door 110, a first division of the interior storage space 106 may be accessed by a user while the lower door 112 remains closed over a second division. In this way, energy usage and efficiency of the refrigerated cabinet 100 may be improved, as the entirety of the interior storage space 106 is not needed to be opened thereby avoiding unnecessary heat exchange between the refrigerated interior and an external environment.

The refrigerated cabinet 100 further provides a latching mechanism 138 formed between the doors 110, 112 for providing selective user manipulation and repositioning of the doors 110, 112. As depicted in the illustrated embodiments, the latching mechanism 138 generally extends from the exterior side 118 of the upper door 110 through to the interior side 114, where the latching mechanism 138 may be selectively coupled with a receiver 140 positioned on the lower door 112. In one embodiment, a latching mechanism 138 extend horizontally through the upper door 110 (e.g., FIG. 2) to couple with the lower door 112, wherein the latching mechanism 138 is generally horizontal and normal to a vertical face of the upper door 110 through which it extends. In an alternative embodiment, the latching mechanism 138 extends vertically through the upper door 110 (e.g., FIG. 3) to couple with the lower door 112, wherein the latching mechanism 138 is generally vertical and parallel to a vertical face of the upper door 110.

The latching mechanism 138 comprises a trigger 142 (FIG. 2) or other user-actuatable interface on the exterior of the refrigerated cabinet 100. In the illustrated embodiments, the trigger 142 is positioned proximate the handle 144 thereby allowing the handle 144 and trigger 142 to be simultaneously grasped and manipulated by a user with one hand. Generally, user actuation of the trigger 142 decouples the latching mechanism 138 of the upper door 110 from the receiver 140 of the lower door 112 thereby allowing the upper door 110 to be opened independent of the lower door 112. Conversely, if the trigger 142 is not fully actuated by the user, the latching mechanism 138 remains coupled to the receiver 140 and both doors 110, 112 may be repositioned (i.e., opened or closed) together simultaneously using the handle 144.

FIG. 2 provides an illustration of a latching mechanism 138, in accordance with an embodiment of the invention. In the illustrated embodiment, the latching mechanism 138 comprises a pivoting latch 146 actuatable by a user via a trigger 142. The trigger 142 is pivotally coupled to the handle 144, wherein the trigger 142 comprises a gripping portion 148 and an arm 150 extending through the upper door 110. The arm 150 is received by cavity 152 of the mullion 132, wherein a protrusion 154 of the arm 150 engages a front lip 156 of the cavity 152 to couple the upper door 110 to the lower door 112. In operation, the gripping portion 148 of the trigger 142 is configured to be pulled by a user toward the handle 144. When pulled, the trigger 142 pivots about pivoting point 158 thereby raising the arm 150 and bring the protrusion 154 out of contact with the front lip 156 of the cavity 152. Once out of contact, the protrusion 154 and arm 150 may be removed from the cavity 152, and the upper door 110 is selectively decoupled from the lower door 112 and may be independently repositioned by the user.

FIG. 3 provides an illustration of a latching mechanism 138, in accordance with an embodiment of the invention. In the illustrated embodiment, the latching mechanism 138 comprises a bell crank latch 160 actuatable by a user via a trigger 162. The trigger 162 is positioned proximate the handle 144. The trigger 162 extends into the upper door 110 to operatively couple to a bell crank 164. The bell crank 164 includes a spring-loaded bolt 166 extending downward from the upper door 110 toward the lower door 112. The bolt 166 is received by a cavity 168 formed in an upper portion 124 of the lower door 112. In operation, the trigger 162 is configured to be pulled by a user toward the handle 144. When pulled, the trigger 162 is configured to actuate the bell crank 164 to pull the spring-loaded bolt 166 out of the cavity 168 of the lower door 112. Once the bolt is removed from the cavity 168, the upper door 110 is selectively decoupled from the lower door 112 and may be independently repositioned by the user.

It should be understood that while a pivoting latch 146 and a bell crank latch 160 are provided as examples of latching mechanisms 138 with respect to FIGS. 2 and 3, these embodiments are non-limiting. It is envisioned herein that alternative latching mechanisms may be used to selectively couple and decouple the doors 110, 112 of the refrigerated cabinet 100 from one another.

It should also be understood that in alternative embodiments, the coupling of the upper door 110 and lower doors 112, as discussed with respect to FIGS. 1-3, may be reversed, wherein the mullion 132 is instead positioned on the lower portion 128 of the upper door 110 wherein the lower door 112 is configured to close and latch on top of a recessed portion of the upper door forming a mullion.

It should further be understood that even though a first door and a second door (e.g., the upper door 110 and the lower door 112) are illustrated and discussed, in other embodiments, the refrigerated cabinet 100 may comprise more than two doors positionable over one or more interior spaces. For example, in one embodiment, the upper door 110 and/or lower door 112 of the refrigerated cabinet may comprise side-by-side doors (i.e., French doors), wherein the fixed mullion 132 and latching mechanism 138 discussed herein may be used for individual sets of adjacent upper and lower doors providing access to one or more interior spaces.

In some embodiments, the mullion 132 and latching mechanism 138 may be used for first and second side-by-side doors, wherein the side-by-side doors engage one another with a fixed mullion and latching mechanism as discussed herein. In an embodiment, an interior storage space may comprise a side-by-side fresh food compartment and a freezer compartment, wherein the compartments are separated and covered by the doors. In yet another embodiment, individual side-by-side doors of a refrigerated cabinet may be further divided into additional upper and lower and/or side-by-side subdivisions and combinations thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A refrigerated cabinet comprising:

a plurality of side walls forming a cabinet body and an interior storage space, the interior storage space accessible through an opening;

a first door and a second door independently positionable over the opening, wherein each of the first door and the second door has an exterior side forming a portion of an exterior surface of the refrigerated cabinet when the first door and second door are both positioned over the opening, wherein the second door comprises a mullion fixed relative to the second door and integrally formed by a portion of the second door, and wherein the first door is configured to engage with the mullion; and a latching mechanism configured to selectively couple the first door and the second door.

2. The refrigerated cabinet of claim 1, wherein the latching mechanism comprises one of a pivoting arm or a bell crank extending through the first door to engage the second door.

3. The refrigerated cabinet of claim 1, wherein the latching mechanism extends through the first door to engage the second door.

4. The refrigerated cabinet of claim 1, wherein the latching mechanism comprises a user-actuatable interface configured to decouple the first door and the second door when the user-actuatable interface is engaged by a user.

5. The refrigerated cabinet of claim 1, further comprising a gasket positioned (i) on the mullion formed by the second door or (ii) on the first door, the gasket being configured to form a seal at an interface between the mullion and the first door when the first door is coupled to the second door.

6. The refrigerated cabinet of claim 1, wherein the first door is an upper door and the second door is a lower door.

7. The refrigerated cabinet of claim 1, wherein the first door is a lower door and the second door is an upper door.

8. The refrigerated cabinet of claim 1, wherein the interior storage space comprises a fresh food compartment, wherein each of the first door and the second door are positionable over the fresh food compartment.

9. A refrigerated cabinet comprising:

a cabinet body having an interior storage space, the interior storage space accessible through an opening;

a first door positionable over the opening, the first door comprising:

a first portion recessed toward an exterior side of the first door, wherein the exterior side is oriented away from the interior storage space;

a second door positionable over the opening independently from the first door, the second door comprising:

a second portion recessed toward an interior side of the second door, wherein the interior side is oriented toward the interior storage space, and wherein the second portion integrally forms a mullion fixed relative to the second door with which the first portion of the first door engages;

wherein each of the first door and the second door has an exterior side forming a portion of an exterior surface of the refrigerated cabinet when the first door and second door are both positioned over the opening; and a latching mechanism configured to selectively couple the first door and the second door.

10. The refrigerated cabinet of claim 9, wherein the second portion of the second door provides a divider between two or more divisions of the interior storage space.

11. The refrigerated cabinet of claim 9, wherein the second portion of the second door comprises an exterior-facing sealing surface configured to engage a corresponding surface of the first portion of the first door.

12. The refrigerated cabinet of claim 9, comprising a gasket positioned on the first portion of the first door or positioned on the second portion of the second door, wherein the gasket is configured to generate a seal between the first portion and the second portion.

13. The refrigerated cabinet of claim 9, wherein the latching mechanism comprises a user-actuatable interface configured to decouple the first door and the second door when the user-actuatable interface is engaged by a user.

14. A refrigerated cabinet comprising:

a cabinet body having an interior storage space, the interior storage space accessible through an opening;

a first door and a second door independently positionable over the opening, wherein, when positioned approximately parallel to each other, the first door and the second door partially overlap with each another and interlock, wherein each of the first door and the second door has an exterior side forming a portion of an exterior surface of the refrigerated cabinet when the first door and second door are both positioned over the opening, wherein the second door comprises a mullion fixed relative to the second door and integrally formed by a portion of the second door, and wherein the first door is configured to engage with the mullion; and a latching mechanism configured to selectively couple the first door and the second door.

15. The refrigerated cabinet of claim 14, wherein the mullion provides a divider between two or more divisions of the interior storage space.

16. The refrigerated cabinet of claim 14, wherein the mullion comprises an exterior-facing sealing surface configured to engage a corresponding surface of the first door.

17. The refrigerated cabinet of claim 14, wherein the latching mechanism extends through the first door to engage the second door.

18. The refrigerated cabinet of claim 14, wherein the interior storage space comprises a fresh food compartment, wherein each of the first door and the second door are positionable over the fresh food compartment.

19. The refrigerated cabinet of claim 14, comprising a gasket positioned on the first door or positioned on the second portion of the second door, wherein the gasket is configured to generate a seal between the first door and the second portion.

20. The refrigerated cabinet of claim 14, wherein the latching mechanism comprises a user-actuatable interface configured to decouple the first door and the second door when the user-actuatable interface is engaged by a user.

* * * * *